United States Patent
Streeky et al.

(12)

(10) Patent No.: US 6,201,079 B1
(45) Date of Patent: *Mar. 13, 2001

(54) PROPYLENE POLYMER RESIN MADE FROM A HIGH ACTIVITY CATALYST HAVING A BROAD THERMAL PROCESSING WINDOW AND ARTICLES MADE THEREFROM

(75) Inventors: Jerome Anthony Streeky; Bruce Howard Bersted, both of Alpharetta; John William Blake, Suwanee; Daan Feng; Charles Richard Hoppin, both of Alpharetta; Benjamin Samuel Tovrog, Roswell, all of GA (US)

(73) Assignee: BP Amoco Corporation, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/717,524

(22) Filed: Sep. 23, 1996

Related U.S. Application Data

(60) Provisional application No. 60/004,561, filed on Sep. 29, 1995, and provisional application No. 60/023,748, filed on Sep. 4, 1996.

(51) Int. Cl.[7] .................................................. C08F 4/64
(52) U.S. Cl. .............................. 526/124.8; 526/124.3; 526/125.3; 526/348.1; 526/351; 502/118; 502/125

(58) Field of Search ....................... 526/348.1, 125.3, 526/124.8, 124.3, 351; 502/118, 125

(56) References Cited

U.S. PATENT DOCUMENTS

| | | | |
|---|---|---|---|
| 4,603,174 | * 7/1986 | Okada et al. | 526/348.1 |
| 4,705,828 | * 11/1987 | Matsumoto et al. | 526/348.1 |
| 4,829,038 | 5/1989 | Hoppin et al. . | |
| 4,866,022 | 9/1989 | Arzoumanidis et al. . | |
| 5,015,612 | * 5/1991 | Kioka et al. | 526/348.1 |
| 5,266,636 | * 11/1993 | Kioka et al. | 526/348.1 |
| 5,484,824 | 1/1996 | Abe et al. . | |
| 5,494,872 | 2/1996 | Hosaka et al. | 502/115 |
| 5,556,920 | * 9/1996 | Tanaka et al. | 526/348.1 |

FOREIGN PATENT DOCUMENTS

| | | |
|---|---|---|
| 321218 A2 | 6/1989 | (EP) . |
| 361371 | 4/1990 | (EP) . |
| 657476 A2 | 6/1995 | (EP) . |
| 657477 A2 | 6/1995 | (EP) . |

* cited by examiner

Primary Examiner—David W. Wu
Assistant Examiner—Caixia Lu
(74) Attorney, Agent, or Firm—Wallace L. Oliver

(57) ABSTRACT

A propylene polymer made using a magnesium halide-supported, titanium-containing solid catalyst component having a broad processing window is produced by incorporating into the polymerization catalyst system a selected alkyl methyldimethoxysilane, preferably isobutylmethyldimethoxysilane. Useful articles made from such resin include OPP film.

11 Claims, 6 Drawing Sheets

PROPYLENE POLYMER RESIN MADE FROM A HIGH ACTIVITY CATALYST HAVING A BROAD THERMAL PROCESSING WINDOW AND ARTICLES MADE THEREFROM

CROSS REFERENCE TO RELATED APPLICATIONS

This application claims benefit under 35 USC 119(e) of U.S. Provisional Application Nos. 60/004,561, filed Sep. 29, 1995, and 60/023,748, filed Sep. 4, 1996, both incorporated by reference herein.

BACKGROUND OF THE INVENTION

This invention relates to formation of articles from propylene polymers which require a broad thermal processing window such as films and fibers and more particularly relates to oriented polypropylene ("OPP") films and fibers produced from a polymer made using a high activity catalyst and specific silane modifier compounds.

Some uses of propylene polymer resin require a larger thermal processing window than conventional resins for superior performance. Although recent advances in catalyst technology, such as use of magnesium halide-supported, titanium-containing catalyst components, have demonstrated increased activity and stereospecificity, the resulting product typically is more regular and crystalline than polymer products made from older catalyst systems. Such an increase in regularity and tacticity, produces a product with a sharper meting point and a narrow thermal processing window, Although many uses of propylene polymers do not require a broad processing window, some critical uses do benefit from such a broad window.

OPP films (sometimes referred to as biaxially oriented (BOPP) films) are used widely in packaging applications. In forming OPP films, propylene polymer resin is extruded and stretched in a machine (longitudinal) direction and simultaneously stretched in a transverse (horizontal) direction to form two axes of orientation. For optimal fabrication performance, the propylene polymer resin should have a specific combination of extractables and solubles components at a specific tacticity (measured by $^{13}C$ nuclear magnetic resonance (NMR) technique) to produce a broad processing window. The ability to control the extractables/solubles and the tacticity of the polymer resin is of paramount importance in producing resins suitable for use in preparing OPP films.

First generation catalyst systems based on titanium tetrachloride and aluminum alkyl were very good at producing the specific polymer properties desired for OPP film resins. However, widespread use of magnesium halide-supported, titanium-containing high activity catalysts ("HAC") has resulted in changes to resulting polymer properties which are not advantageous for OPP film resins. These changes include a higher tacticity and lower extractables and solubles together with a blockier distribution of tacticity mistakes. The ability to control the extractables/solubles as a function of NMR tacticity relationship with a HAC catalyst would be very useful in producing improved OPP film resins.

Use of solid, transition metal-based, HAC, olefin polymerization catalyst components is well known in the art including such solid components supported on a metal oxide, halide or other salt such as widely-described magnesium-containing, titanium halide-based catalyst components.

Numerous individual processes or process steps have been disclosed to produce improved supported, magnesium-containing, titanium-containing, electron donor-containing olefin polymerization or copolymerization catalysts. For example, Arzoumanidis et al., U.S. Pat. No. 4,866,022, incorporated by reference herein, discloses a method for forming an advantageous alpha-olefin polymerization or copolymerization catalyst or catalyst component which involves a specific sequence of specific individual process steps such that the resulting catalyst or catalyst component has exceptionally high activity and stereospecificity combined with very good morphology.

In addition to the solid, magnesium-containing, titanium-containing HAC catalyst component, the polymerization catalyst system used to produce propylene polymers uses an aluminum alkyl component, such as triethylaluminum, and typically an external modifier component such as at silane compound as described in U.S. Pat. No. 4,829,038, incorporated by reference herein.

Use of external silane modifiers in a propylene polymerization catalyst system has been widely described. Use of alkyl or aryl methoxysilanes, and particularly dialkyldimethoxysilanes, has been described. The present invention describes using a specific silane composition as an external modifier to control the tacticity versus extractables/solubles relationship and thereby producing a resin which has a broad thermal processing window and is useful in producing a particularly beneficial OPP film. The family of such silanes comprises branched $C_4$–$C_5$ alkyl methyl dimethoxysilanes and particularly isobutylmethyldimethoxysilane ("IBMDMS").

Use of IBMDMS as a modifier useful to produce propylene polymers has been described in U.S. Pat. No. 4,829,038 and Published European Application EP 0 361 371; however, neither of these references teach or suggest the specific properties of a propylene polymer actually produced using IBMDMS nor describe any possible advantage regarding the use of such modifier in producing an oriented polypropylene film.

U.S. Pat. No. 5,484,824 describes a thermoplastic resin composition useful in automotive bumpers comprising a crystalline polypropylene and an ethylene-butene copolymer rubber. IBMDMS is listed as a possible modifier useful in preparing the crystalline polypropylene, however, no specific properties of a polymer actually made with IBMDMS are described. Further, using such polymer to form a film or fiber is not suggested.

European Patent Application EP 0 657 476 is directed to an alpha-olefin polymer useful for OPP film which is made using various silane external modifiers such as n-alkylmethyldimethoxysilanes. Applicants find that the products of this invention are superior to those described in this reference in terms of an unexpected balance of product properties and catalyst yield.

European Patent Application EP 0 657 477 is directed to an alpha-olefin polymer useful for OPP film which is made using at least two silane external modifiers such as n-alkylmethyldimethoxysilanes.

As noted above, a superior HAC-produced propylene polymer with a broad processing window useful for manufacturing products, such as OPP films, has been desired. This invention describes a propylene polymeric resin which is useful in forming advantageous film products and especially OPP film.

SUMMARY OF THE INVENTION

In one aspect, this invention is an oriented polypropylene film made from a propylene polymer produced by polymerizing propylene using a catalyst system comprising:

(a) a high activity magnesium halide-supported, titanium-containing solid component;
(b) an aluminum alkyl; and
(c) an external modifier comprising a branched $C_4$–$C_8$ alkyl methyldimethoxysilane, preferably isobutylmethyldimethoxysilane.

In another aspect this invention is a process to form a biaxially oriented polypropylene film comprising:
(a) forming a film by extruding a propylene polymer produced by polymerizing propylene under polymerization conditions using
  (i) a high activity magnesium halide-supported, titanium-containing solid component,
  (ii) an aluminum alkyl, preferably triethylaluminum, and
  (iii) an external modifier comprising a $C_4$–$C_8$ branched alkyl methyldimethoxysilane, preferably isobutylmethyldimethoxysilane; and
(b) stretching the resulting film in the machine direction and in the transverse direction to form a biaxially oriented film.

BRIEF DESCRIPTION OF THE INVENTION

Figure 1:
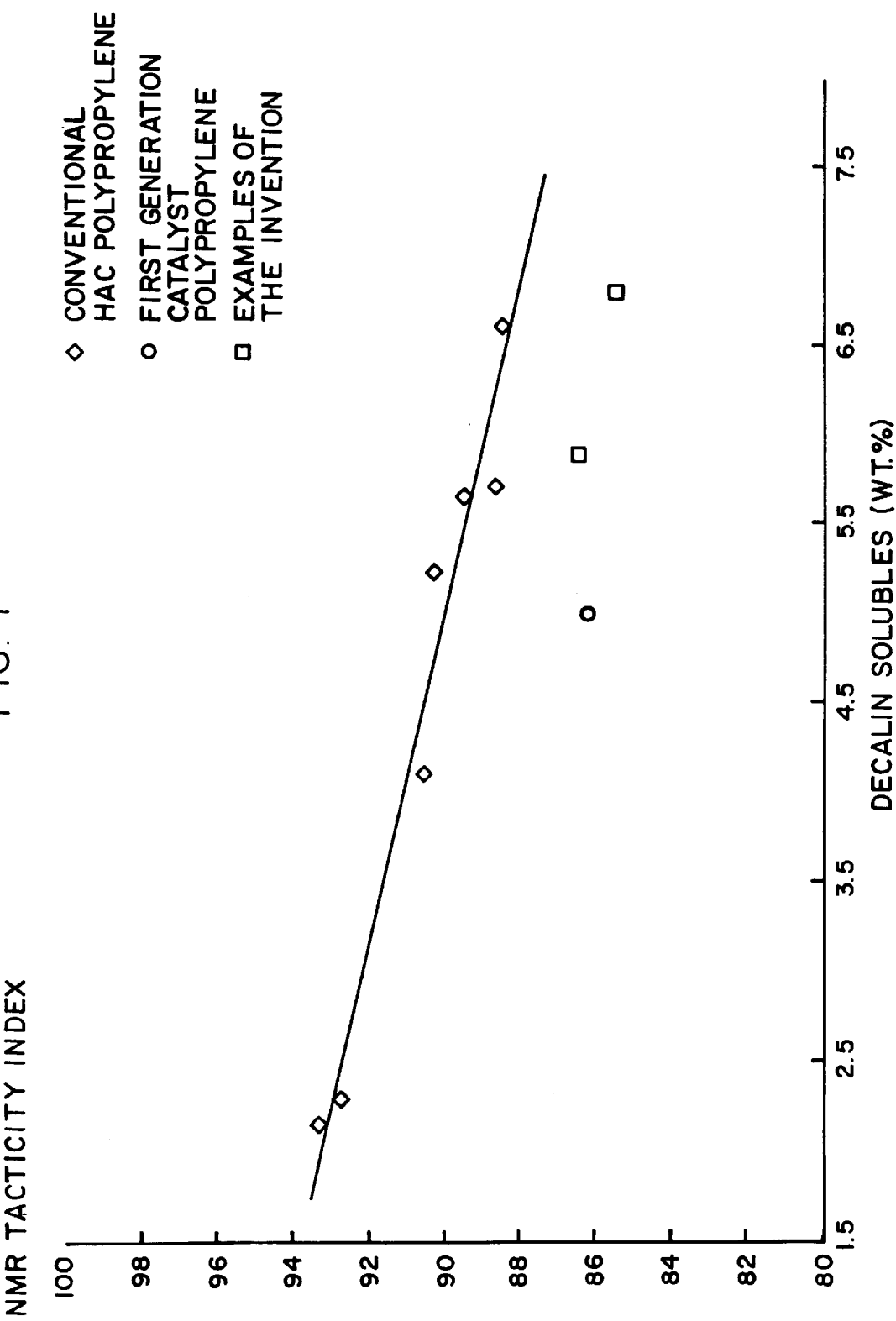
FIG. 1 is a plot of Decalin Solubles versus NMR Tacticity Index for a conventional HAC produced polypropylene together with data points for a first generation catalyst produced OPP-film grade polypropylene and examples of this invention.

Typically, propylene polymers are formed into useful articles through a thermal processing step, such as extrusion, injection molding, blow molding, or spinning. Some uses require a broader thermal processing window in order to produce desired properties. This invention is directed to articles, and processes to manufacture such articles, which require a broad thermal processing window and which are manufactured from a HAC-produced propylene polymer.

The propylene polymers useful in forming the articles of this invention, are made by contacting propylene monomer with a suitable HAC-catalyst system under polymerization conditions to form normally solid, predominantly crystalline polymer. As described below, such polymerization may be conducted in the gas phase, slurry phase or bulk phase. In such polymerization, the catalyst system comprises (a) a magnesium-containing, titanium-containing solid component which typically contains an internal electron donor modifier compound, (b) an aluminum alkyl compound, and (c) an external silane modifier compound. The products of this invention use a selected silane external modifier compound.

The propylene polymer products useful in this invention demonstrate properties not before appreciated in HAC-produced resins. One such property is the control relationship between the silane/titanium ratio in the catalyst system and the measured extractables/solubles of the resulting resin.

As noted above, a method to determine stereoregularity of a propylene polymer uses $^{13}C$ NMR and is based on the ability to identify relative positions of adjacent methyl groups on a polypropylene polymer backbone. If the methyl groups of two adjacent propylene monomer units (—CH($CH_3$)—$CH_2$—) are on the same side of the polymer chain, such two methyl groups form a meso ("m") dyad. The relative percentage of these meso dyads is expressed as %m. If the two methyl groups of adjacent monomer units are on opposite sides of the polymer chain, such two methyl groups form a racemic ("r") dyad, and the relative percentage of these racemic dyads is expressed as %r. Advances in $^{13}C$ NMR techniques permit measurement of the relative positioning of three, four, and five successive methyl groups, which are referred to as triads, tetrads and pentads, respectively.

Current NMR instruments can quantify the specific distribution of pentads in a polymer sample. There are ten unique pentads which are possible in a propylene polymer:

| | |
|---|---|
| m m m m | r r r r |
| m m m r | m m r m |
| m m r r | m r r m |
| r m m r | r m r m |
| r m r r | m r r r |

A ball and stick representation of the mmmm pentad is:

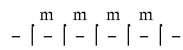

Two of the possible pentads cannot be separated by NMR (mmrm and rmmr) and are reported together. Two of the ten pentads (mmrr and mrrm) result from the displacement of a single methyl group on the opposite side of the polymer chain in an isotactic sequence. Since the mmmm (m4) pentad represents a perfect isotactic stereoregular structure, measurement of this pentad (as %m4) reflects isotacticity and potential crystallinity. As used herein, the term NMR tacticity index is the percent of m4 (%m4) pentads as measured by $^{13}C$ NMR. Thus, if 96% of pentads measured by $^{13}C$ NMR in a propylene polymer are m4, the NMR tacticity index is 96.

Decalin Solubles ("DS") is a measure of hydrocarbon soluble and extractable materials, such as atactic, non-crystalline, and oligomeric components, contained in a propylene polymer and is useful in correlating a particular resin to desirable resin properties such as processing window. DS is determined by completely dissolving a 2.0-gram sample of polymer in 100 milliliters of Irganox 1076-stabilized (0.020 grams/liter) decalin (decahydronaphthalene) by warming the slurry to 165° C. and stirring the slurry for two hours. Once the polymer is dissolved, the solution is allowed to cool overnight (at least 16 hours). After the cooling period, the solution is filtered from the precipitated polymer. A measured portion of the solution is withdrawn and, after removing the decalin solvent, the resulting samples are completely dried in a 120° C. vacuum oven. The final dried samples are weighed to determine the amount of decalin-soluble polymer. Results are reported as a weight percent polymer remaining soluble in decalin.

In typical polymerization processes, such as in a gas-phase process, the mode for controlling the amount of extractables/solubles material in a polymer with HAC catalyst is performed by adjustment of the Si/Ti ratio in the reactor. At lower silane content, polymer tacticity drops and the amount of extractables/solubles increases. Despite the adjustment of the polymer properties, resin from a HAC catalyst does not match the polymer properties from a first generation catalyst. This is shown in FIG. 1 in the NMR tacticity index of the polymer (m4%) is plotted against the weight percent Decalin Solubles (DS) in the polymer sample. The points and lines describe polymers made with a HAC catalyst prepared according to the teachings of U.S. Pat. Nos. 4,866,022; 4,988,656 and 5,013,702, all incorporated by reference herein, with triethylaluminum as the co-catalyst and diisobutyldimethoxysilane (DIBDMS) as the external modifier. Also noted in FIG. 1 is a product produced with a first generation type catalyst and had excellent OPP resin properties. As is observed, the HAC product has a higher NMR tacticity at a given DS level. If the balance between tacticity and solubles is better in OPP applications for the first generation catalyst material, then the goal is to lower the tacticity of a HAC produced polymer at a given DS level. Also shown in FIG. 1 are data points representing products of this invention as listed in Table II.

As demonstrated in this invention, by changing the substituents of the external silane modifier, the tacticity and the tacticity mistake distribution can be controlled. Further, this control can be translated into an advantage in OPP film processing as measured by a test which relates the results from a shear dynamic mechanical analysis ("SDMA") for the solid to melt transition state to the size of the operating window for film production. By controlling the NMR tacticity versus extractables/solubles ("Decalin Solubles") relationship, the SDMA results indicate a larger film operating window is achieved. This larger operating window results in a polymer better suited to OPP film production.

In OPP film and similar processes, polypropylene sheets are processed in the solid state. During the process, the polymer is heated up to near and below the melting temperature for stretching or thermoforming. Therefore, the dynamic mechanical properties (moduli) are critical for the process.

A useful test to provide information on mechanical properties of polypropylene resin in these transition states is the shear dynamic mechanical analysis (SDMA). In this test, the sample is tested under a vibrating shear force. The SDMA test can measure the dynamic mechanical properties of a resin from the solid state into the molten state or from molten state to solid state. The dynamic mechanical properties at the transition state from solid to melt are important to film and thermoforming processes. The information at the transition state from melt to solid are critical for fiber and injection molding processes. Another unique feature of SDMA is that it can determine strain induced crystallization temperature, which relates to the molecular structure of the polymer and the processability of the resin. Strain induced crystallization also is important for fiber spinning and injection molding process. SDMA results can be used to relate processing temperature window for film and thermoforming applications and processability for fiber spinning and injection processes.

According to this invention, a suitable propylene polymer resin is prepared using a HAC catalyst component, an aluminum alkyl and a selected silane under polymerization conditions. Useful silanes are selected from dissimilar aliphatic alkyl silanes such as aliphatic $C_3$–$C_{12}$ alkyl methyl dimethoxy silanes. The silanes selected in this invention are from branched aliphatic $C_4$–$C_8$ alkyl dimethoxy silanes and, more preferably, aliphatic $C_4$–$C_6$ alkyl dimethoxy silanes. The silanes selected in this invention are $C_4$–$C_8$, preferably aliphatic $C_4$–$C_6$ branched, alkyl methyl dimethoxy silanes. Suitable branched alkyl groups include isobutyl, s-butyl, isopentyl (also known as isoamyl), neo-pentyl, neo-hexyl, iso-octyl, and the like. The most preferable silanes are selected from branched $C_4$–$C_5$ alkyl methyl dimethoxy silanes. The preferable silanes are isobutylmethyldimethoxysilane, iso-amyl methyldimethoxysilane, and neo-pentylmethyldimethoxysilane. The most preferable silane is isobutylmethyldimethoxysilane based upon a balance of physical properties of the resulting polypropylene and maintenance of activity of the catalyst system.

As further described below, a resin suitable for use in this invention is produced by incorporating into a HAC polymerization catalyst system a selected silane at a level such that the Si/Ti ratio generally ranges from about 1 to about 10 and preferably from about 2 to about 4. Use of silanes as external modifiers is described in U.S. Pat. Nos. 4,829,038 and 4,990,478, both incorporated by reference herein.

Propylene polymer resins useful in this invention exhibit a broad thermal processing window. Typically useful resins have a $\Delta T$ (measured according to the SDMA Test described below) of greater than 10° C. and most preferably greater than about 13° C.

Preferable resins useful in this invention exhibit a mmrr NMR pentad content of greater than about 3% for resins having Decalin Solubles greater than about 5 wt. %, and more preferable resins have an NMR mmrr pentad content of about 3.5% for resins having Decalin Solubles greater than about 6 wt. %.

HAC titanium-containing components useful in this invention generally are supported on hydrocarbon-insoluble, magnesium-containing compounds in combination with an electron donor compound. Such supported titanium-containing olefin polymerization catalyst component typically is formed by reacting a titanium (IV) halide, an organic electron donor compound and a magnesium-containing compound. Optionally, such supported titanium-containing reaction product may be further treated or modified by comminution or further chemical treatment with additional electron donor or Lewis acid species.

Suitable magnesium-containing compounds include magnesium halides; a reaction product of a magnesium halide such as magnesium chloride or magnesium bromide with an organic compound, such as an alcohol or an organic acid ester, or with an organometallic compound of metals of Groups I–Ill; magnesium alcoholates; or magnesium alkyls.

One possible magnesium-containing compound, described in U.S. Pat. No. 4,227,370, is based on at least one magnesium alcoholate which may be pretreated with at least one modifier such as mineral acid or anhydrides of sulfur, organometallic, chalcogenide derivative of hydrogen sulfide, and organic acids and esters thereof. Such magnesium-containing compound may be the pretreatment product of at least one magnesium alcoholate, at least one Group II or IIIA metal alkyl and, optionally, at least one modifier such as a mineral acid or an anhydride, sulfur, organometallic chalcogenide derivatives of hydrogen sulfide, organic acids and organic acid esters. Solid magnesium alkoxide may be milled prior to further treatment. In another catalyst component, magnesium ethoxide may be reacted with an aromatic ester such as phenyl benzoate prior to further treatment with a Lewis acid.

Another possible catalyst component is described in U.S. Pat. No. 4,581,342, assigned to a common assignee, incorporated by reference herein. The catalyst component described therein is prepared by complexing a magnesium alkyl composition with a specific class of hindered aromatic ester such as ethyl 2,6-dimethylbenzoate followed by reaction with a compatible precipitation agent such as silicon tetrachloride and a suitable titanium (IV) compound in combination with an organic electron donor compound in a suitable diluent.

The possible solid catalyst components listed above only are illustrative of many possible solid, magnesium-containing, titanium halide-based, hydrocarbon-insoluble catalyst components useful in this invention and known to the art. This invention is not limited to a specific supported catalyst component.

Typically, HAC supported catalyst components useful for polymerizing propylene and higher olefins as well as for polymerizing propylene and higher olefins with a minor amount of ethylene contain an electron donor component as an internal modifier. Such internal modifier is an integral part of the solid supported component as is distinguished from an external electron donor component, which together with an aluminum alkyl component, comprises the catalyst system. The external modifier and aluminum alkyl may be combined with the solid supported component shortly before the combination is contacted with an olefin monomer, although the components may be fed to the reactor separately, typically contained in a liquid diluent such as hexane.

Generally, organic electron donors have been described as useful in preparation of the stereospecific supported catalyst components including organic compounds containing oxygen, nitrogen, sulfur, and/or phosphorus. Such compounds include organic acids, organic acid anhydrides, organic acid esters, alcohols, ethers, aldehydes, ketones, amines, amine oxides, amides, thiols, various phosphorus acid esters and amides, and the like. Mixtures of organic electron donors have been described as useful in incorporating into supported catalyst components.

Examples of electron donor systems include those described in U.S. Pat. Nos. 4,971,937, 5,068,213, 5,095,153, and 5,106,807, as well as published European application EP 0 452 156. These references generally describe classes of diethers useful as electron donor components. Other electron donors are described in U.S. Pat. Nos. 3,642,746, 4,186,107, 4,473,660, 4,522,930, 4,565,798, 4,693,990, 4,814,312, 4,829,034, and 4,904,628. All of these patents are incorporated herein.

Internal electron donor materials are incorporated into a solid, supported catalyst component during formation of such component. Typically, such electron donor material is added with, or in a separate step, during treatment of a solid magnesium-containing material with a titanium (IV) compound. Most typically, a solution of titanium tetrachloride and the internal electron donor modifier material is contacted with a magnesium-containing material. Such magnesium-containing material typically is in the form of discrete particles and may contain other materials such as transition metals and organic compounds.

Titanium (IV) compounds useful in preparation of the catalyst or catalyst component of this invention are titanium halides and haloalcoholates having 1 to about 20 carbon atoms per alcoholate group such as methoxy, ethoxy, butoxy, hexoxy, phenoxy, decoxy, naphthoxy, dodecoxy and eicosoxy. Mixtures of titanium compounds can be employed if desired. Preferred titanium compounds are the halides and haloalcoholates having 1 to 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly $TiCl_4$ are most preferred from the standpoint of attaining maximum activity and stereospecificity.

The magnesium-containing material, the titanium halide component, and the electron donor components useful in this invention are reacted at temperatures ranging from about −10° C. to about 170° C., generally over a period of several minutes to several hours, and are contacted in amounts such that the atomic ratio of titanium to magnesium components in the reaction mixture (calculated as magnesium in magnesium compound from which the magnesium-containing species is formed) is at least about 0.5:1. Preferably, this ratio ranges from about 0.5:1 to about 20:1. Greater amounts of titanium may be employed without adversely affecting catalyst component performance, but typically there is no need to exceed a titanium to magnesium ratio of about 20:1. More preferably, the titanium to magnesium ratio ranges from about 2:1 to about 15:1 to ensure that the catalyst components contain sufficient titanium to exhibit good activities without being wasteful of the titanium compound employed in preparation. The electron donor components are employed in a total amount ranging up from about 1.0 mole per gram atom of titanium in the titanium compound, and preferably from about 0.001 to about 0.6 mole per gram atom of titanium in the titanium compound. Best results are achieved when this ratio ranges from about 0.01 to about 0.3 mole per gram atom of titanium.

Preferably, the aforesaid electron donor compounds and titanium compound is contacted with the precipitated solid particles in the presence of an inert hydrocarbon diluent, although other suitable techniques can be employed. Suitable diluents are substantially inert to the components employed and are liquid at the temperature and pressure employed.

A suitable diluent that can be used in any of the aforesaid steps should be substantially inert to the reactants employed and preferably is liquid at the temperatures and pressures used. A particular step may be conducted at an elevated pressure so that lower boiling diluents can be used at higher temperatures. Diluents may be hydrocarbon-based liquids such as aliphatic, substituted aliphatic, aromatic or substituted aromatic liquids. Although aromatic hydrocarbons, such as toluene, and substituted aromatics are useful, alkane diluents such as hexane and heptane are preferred if minimization of aromatic-containing waste streams is desired. Aromatic hydrocarbons, such as toluene may be useful if such material can be recycled in the manufacturing process. Also useful are higher boiling aliphatic liquids such as kerosene. Mixtures of diluents may be used. One useful diluent component is Isopar G® which is a $C_{10}$-average isoparaffinic hydrocarbon boiling at 156–176° C. Examples of useful diluents include alkanes such as hexane, cyclohexane, methylcyclohexane, heptane, octane, nonane, decane, undecane, and the like; haloalkanes such as 1,2-dichloroethane, 1,1,2-trichloroethane, carbon tetrachloride and the like; aromatics such as benzene, toluene, xylenes and ethylbenzene; and halogenated and hydrogenated aromatics such as chlorobenzene and o-di-chlorobenzene.

Each of the aforesaid preparative steps is conducted in the substantial absence of water, oxygen, carbon monoxide, and other extraneous materials capable of adversely affecting the performance of the catalyst or catalyst component of this invention. Such materials are conveniently excluded by carrying out the procedures in the presence of an inert gas such as nitrogen or argon, or by other suitable means. Optionally, all or part of the process can be conducted in the presence of one or more alpha-olefins which, when introduced into the preparative system in gaseous form, can serve to exclude catalyst poisons. The presence of one or more alpha-olefins also can result in improved stereospecificity. Useful alpha-olefins include ethylene, propylene, butene-1, pentene-1, 4-methylpentene-1, hexene-1, and mixtures thereof. Of course, any alpha-olefin employed should be of relatively high purity, for example, polymerization grade or higher. Other precautions which aid in excluding extraneous poisons include purification of any diluent to be employed, such as by percolation through molecular sieves and/or silica gel prior to use, and drying and/or purifying other reagents.

As a result of the above-described preparation steps, there is obtained a solid reaction product suitable for use as a catalyst or catalyst component. Prior to such use, it is desirable to remove incompletely-reacted starting materials from the solid reaction product. This is conveniently accomplished by washing the solid, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance. Use of liquid hydrocarbons such as hexane or heptane is preferred to minimize halogenated waste streams.

Although not required, the final solid reaction product prepared may be contacted with at least one Lewis acid prior to polymerization. Such Lewis acids useful according to this invention are materials which are liquid or soluble in a liquid diluent at treatment temperatures and have a Lewis acidity high enough to remove impurities such as unreacted starting materials and poorly affixed compounds from the surface of the solid reaction product. Preferred Lewis adds include halides of Group III–V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired. Such Lewis acid may be used in a compatible diluent.

Although not required, the final solid reaction product may be washed with an inert liquid hydrocarbon or halogenated hydrocarbon before contact with a Lewis acid. If such a wash is conducted, it is preferred to substantially remove the inert liquid prior to contacting the washed solid with Lewis acid. In an advantageous procedure, the precipitated particles are treated with titanium tetrachloride and then with titanium tetrachloride in the presence of one or more electron donors. More preferably, the product is treated one or more times with a liquid hydrocarbon such as hexane, heptane, or toluene and finally with titanium tetrachloride again.

The electron donor typically is a $C_2$–$C_6$ alkyl ester of a $C_5$–$C_{10}$ alkyl or aromatic acid and preferably is a dialkylphthalate wherein each alkyl group may be the same or different and contains from 3 to 5 carbon atoms. Preferably the second electron donor is an o-dialkylphthalate. The second electron donor is preferably a dibutylphthalate and more preferably is di-n-butylphthalate or di-i-butylphthalate.

Although the chemical structure of the catalyst or catalyst components of this invention is not known precisely, the components generally comprise from about 1 to about 6 weight percent titanium, from about 10 to about 25 weight percent magnesium, and from about 45 to about 65 weight percent halogen. Preferably, the catalyst component of this invention comprise from about 2.0 to about 4 weight percent titanium, from about 15 to about 21 weight percent magnesium and from about 55 to about 65 weight percent chlorine.

In the solid catalyst component of this invention produced by the method of this invention, the atomic ratio of magnesium to titanium is at least about 0.3:1 and preferably, is from about 0.4:1 to about 20:1 and more preferably, from about 3:1 to about 15:1.

Prepolymerization or encapsulation of the catalyst or catalyst component of this invention also may be carded out prior to being used in the polymerization or copolymerization of alpha olefins. A particularly useful Prepolymerization procedure is described in U.S. Pat. No. 4,579,836, which is incorporated herein by reference.

Typically, the catalyst or catalyst component of this invention is used in conjunction with a cocatalyst component including a Group II or III metal alkyl and, typically, one or more modifier compounds. Useful Group II and IIIA metal alkyls are compounds of the formula $MR_m$ wherein M is a Group II or IIIA metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl. From the standpoint of catalyst component performance, preferred Group II and IIIA metal alkyls are those of magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(Cl_2H_{25})_2$, $Zn(CH_3)_2$, $Zn(C_2H_5)_2$, $Zn(C_4H_9)_2$, $Zn(C_4H_9)$ $(C_8H_{17})$, $Zn(C_6H_{13})_2$, $Zn(C_6H_{13})_3$, and $Al(C_{12}H_{25})_3$. A magnesium, zinc, or aluminum alkyl containing 1 to about 6 carbon atoms per alkyl radical may be used. Aluminum alkyls are preferred and most preferably trialkylaluminums containing 1 to about 6 carbon atoms per alkyl radical, and particularly triethylaluminum and triisobutylaluminum or a combination thereof are used.

If desired, metal alkyls having one or more halogen or hydride groups can be employed, such as ethylaluminum dichloride, diethylaluminum chloride, diethylaluminum hydride, diisobutylaluminum hydride, and the like.

A typical catalyst system for the polymerization or copolymerization of alpha-olefins is formed by combining the supported titanium-containing catalyst or catalyst component of this invention and an alkyl aluminum compound as a co-catalyst, together with at least one external modifier which typically is an electron donor and, preferably, is a silane. Typically, useful aluminum-to-titanium atomic ratios in such catalyst systems are about 10 to about 500 and preferably about 30 to about 300. Typical aluminum-to-electron donor molar ratios in such catalyst systems are about 2 to about 60. Typical aluminum-to-silane compound molar ratios in such catalyst systems are about 3 to about 50.

To optimize the activity and stereospecificity of this cocatalyst system, it is preferred to employ one or more modifiers, typically electron donors, and including compounds such as silanes, mineral acids, organometallic chalcogenide derivatives of hydrogen sulfide, organic acids, organic acid esters and mixtures thereof.

Organic electron donors useful as external modifiers for the aforesaid cocatalyst system are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors also may be used.

Particular organic acids and esters are benzoic acid, halobenzoic acids, phthalic acid, isophthalic acid, terephthalic acid, and the alkyl esters thereof wherein the alkyl group contains 1 to 6 carbon atoms such as methyl chlorobenzoates, butyl benzoate, isobutyl benzoate, methyl anisate, ethyl anisate, methyl p-toluate, hexylbenzoate, and cyclohexyl benzoate, and diisobutyl phthalate as these give good results in terms of activity and stereospecificity and are convenient to use.

The aforesaid cocatalyst system advantageously and preferably contains the aliphatic silane external modifier described in this invention.

The catalyst or catalyst component of this invention is useful in the stereospecific polymerization or copolymerization of alpha-olefins containing 3 or more carbon atoms such as propylene, butene-1, pentene-1, 4-methylpentene-1, and hexene-1, as well as mixtures thereof and mixtures thereof with ethylene. The catalyst or catalyst component of this invention is particularly effective in the stereospecific polymerization or copolymerization of propylene or mixtures thereof with up to about 30 mole percent ethylene or a higher alpha-olefin. According to the invention, highly crystalline polyalpha-olefin homopolymers or copolymers are prepared by contacting at least one alpha-olefin with the above-described catalyst or catalyst component of this invention under polymerization or copolymerization conditions. Such conditions include polymerization or copolymerization temperature and time, pressure(s) of the monomer(s), avoidance of contamination of catalyst, choice of polymerization or copolymerization medium in slurry processes, the use of additives to control homopolymer or copolymer molecular weights, and other conditions well known to persons skilled in the art. Slurry-, bulk-, and vapor-phase polymerization or copolymerization processes are contemplated herein.

Typically, a catalyst or catalyst component of this invention is used in amounts ranging from about 0.2 to 0.01 (preferably 0.1 to 0.02) milligrams of catalyst to gram of polymer or copolymer produced.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to result in the production of unreasonably high levels of stereorandom products due to excessively rapid polymerization or copolymerization rates. Generally, temperatures range from about 0° to about 120° C. with a range of from about 20° C. to about 95° C. being preferred from the standpoint of attaining good catalyst performance and high production rates. More preferably, polymerization according to this invention is carried out at temperatures ranging from about 50° C. to about 80° C.

Alpha-olefin polymerization or copolymerization according to this invention is carried out at monomer pressures of about atmospheric or above. Generally, monomer pressures range from about 20 to about 600 psi, although in vapor phase polymerizations or copolymerizations, monomer pressures should not be below the vapor pressure at the polymerization or copolymerization temperature of the alpha-olefin to be polymerized or copolymerized.

The polymerization or copolymerization time will generally range from about ½ to several hours in batch processes with corresponding average residence times in continuous processes. Polymerization or copolymerization times ranging from about 1 to about 4 hours are typical in autoclave-type reactions. In slurry processes, the polymerization or copolymerization time can be regulated as desired. Polymerization or copolymerization times ranging from about ½ to several hours are generally sufficient in continuous slurry processes.

Diluents suitable for use in slurry polymerization or copolymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene. Chloronaphthalene, ortho-dichlorobenzene, tetrahydro-naphthalene, decahydronaphthalene; high molecular weight liquid paraffins or mixtures thereof, and other well-known diluents. It often is desirable to purify the polymerization or copolymerization medium prior to use, such as by distillation, percolation through molecular sieves, contacting with a compound such as an alkylaluminum compound capable of removing trace impurities, or by other suitable means.

Examples of gas-phase polymerization or copolymerization processes in which the catalyst or catalyst component of this invention is useful include both stirred bed reactors and fluidized bed reactor systems and are described in U.S. Pat. Nos. 3,957,448; 3,965,083; 3,971,786; 3,970,611; 4,129,701; 4,101,289; 3,652,527; and 4,003,712, all incorporated by reference herein. Typical gas phase olefin polymerization or copolymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer, typically, is provided to the reactor through a recycle gas system in which unreacted monomer removed as off-gas and fresh feed monomer are mixed and injected into the reactor vessel. For production of impact copolymers, homopolymer formed from the first monomer in the first reactor is reacted with the second monomer in the second reactor. A quench liquid, which can be liquid monomer, can be added to polymerizing or copolymerizing olefin through the recycle gas system in order to control temperature.

Irrespective of polymerization or copolymerization technique, polymerization or copolymerization is carried out under conditions that exclude oxygen, water, and other materials that act as catalyst poisons. Also, according to this invention, polymerization or copolymerization can be carried out in the presence of additives to control polymer or copolymer molecular weights. Hydrogen is typically employed for this purpose in a manner well known to persons of skill in the art. Although not usually required, upon completion of polymerization or copolymerization, or when it is desired to terminate polymerization or copolymerization or at least temporarily deactivate the catalyst or catalyst component of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Homopolymer or copolymer yields are sufficiently high relative to the amount of catalyst employed so that useful products can be obtained without separation of catalyst residues. Further, levels of stereorandom by-products are sufficiently low so that useful products can be obtained without separation thereof. The polymeric or copolymeric products produced in the presence of the invented catalyst can be fabricated into useful articles by extrusion, injection molding, and other common techniques.

This invention is illustrated, but not limited by the following examples.

EXAMPLES

A series of examples and comparative runs were conducted to produce propylene polymer resin suitable for forming into the articles of this invention. In these tests various external silane modifiers were used to illustrate the applicability of this invention. The specific silanes used are identified in Table I. All of the silanes were available through Huls America, Inc. and were used as received.

TABLE I

| Silane Type | Silane | Abbreviation |
|---|---|---|
| $R_2(OCH_3)_2Si$ | Di-isobutyldimethoxysilane | DIBDMS |
|  | Di-cyclohexyldimethoxysilane | DCHDMS |
| $R_2(OCH_2H_5)_2Si$ | Di-isobutyldiethoxysilane | DIBDES |
| cyclo$R(OCH_3)_2Si$ | Cyclohexylmethyldimethoxysilane | CHMDMS |
|  | Cyclopentylmethyldimethoxysilane | CPMDMS |
| $R_1R_2(OCH_3)_2Si$ | Iso-butylmethyldimethoxysilane | IBMDMS |
|  | Iso-amylmethyldimethoxysilane | IAMDMS |
|  | Neo-hexylmethyldimethoxysilane | NeHMDMS |
| $R_1R_2(OC_2H_5)_2Si$ | Phenylmethyldiethoxysilane | PMDES |

EXAMPLES I–IV AND COMPARATIVE RUNS 1–3

In order to demonstrate examples of this invention and to make comparative runs, propylene polymerizations were conducted in a laboratory gas-phase reactor using a supported HAC catalyst component produced in accordance with U.S. Pat. No. 4,886,022. Triethylaluminum was used as the co catalyst at an Al/Mg ratio of 6. The amount of silane modifier was controlled in the polymerizations such that the Si/Ti ratio was in the range 1 to 9 and the target melt flow rate (MFR) of the polymer was 2.5 to 3. These propylene polymerizations were performed in a one-gallon (3.8-liter) continuous, horizontal, cylindrical gas-phase reactor measuring 10 cm in diameter and 30 cm in length based on that described in U.S. Pat. No. 3,965,083. The reactor was equipped with an on-gas port for recycling reactor gas through a condenser and back through a recycle line to the recycle nozzles in the reactor. Propylene liquid was used as the quench liquid to help remove the heat generated in the reactor during the polymerization. During operation, polypropylene powder produced in the reactor bed, passed over a weir, and was discharged through a powder discharge system into a secondary closed vessel blanketed with nitrogen. The polymer bed was agitated by paddles attached to a longitudinal shaft within the reactor that was rotated at about 50 rpm. The reactor temperature and pressure were maintained at 160° F. (71° C.) and 300 psig (2100 kPa) respectively. The titanium-containing catalyst was introduced into the reactor as a 1.5 wt % slurry in hexane through a liquid propylene-flushed catalyst addition nozzle. A mixture of the silane modifier and 20% triethylaluminum in hexane at an Al/Mg of 6 and Si/Ti molar ratios indicated in Table II were fed separately to the reactor through a liquid propylene-flushed co-catalyst addition nozzle. Hydrogen was fed to the reactor in order to maintain a powder melt flow rate of between 2.5–3 grams/10 minutes. The amount of hydrogen required in IBMDMS examples was about half that needed for DIBDMS runs. Production rate was about 0.5 lb/hr (225 g/hr).

Figure 2:
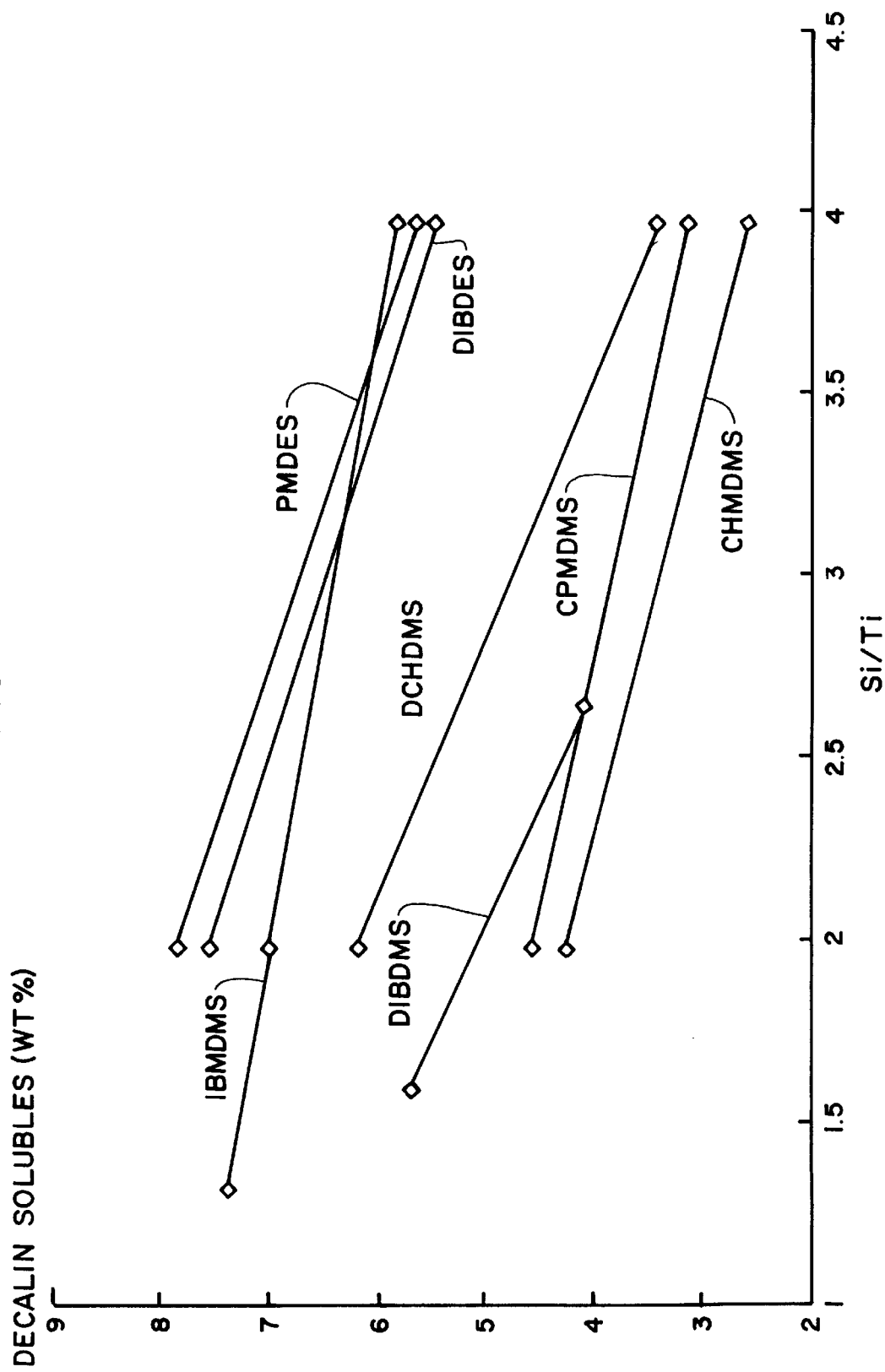
FIG. 2 is a plot of Decalin Solubles versus Si/Ti ratio used in production of polypropylene resins using selected silane external modifiers as listed in Table III.

Data from the polymerizations are summarized in Table II. Catalyst yields for all of the alternate external modifiers were lower than the reference material, DIBDMS. Molecular weight distributions (MWD) as measured by Mw/Mn from GPC show both broader and narrower polymer MWD. From the data in Table II, the various silane external modifiers do not exhibit the same DS versus Si/Ti relationship. To demonstrate this observation, FIG. 2 plots the variation of DS with changes in Si/Ti for each of the modifiers in the study. The plot demonstrates that each silane has a characteristic DS response to changes in variation of the Si/Ti. A second and unexpected observation from the plot is the silanes fall in two categories characterized by the slopes of the DS versus Si/Ti lines. Four silanes, DIBDMS, DCHDMS, DIBDES and PMDES, are in the first group. These silanes are characterized by a steeper slope for the DS versus Si/Ti relationship. The second group of silanes, IBMDMS, CPMDMS and CHMDMS, is characterized by a less steep slope for the DS versus Si/Ti relationship.

TABLE II

Summary of Polymerization Results with Selected External Modifiers

| Ex. (Run) | Silane Modifier | Si/Ti | MFR (g./10 min.) | Polymer Yield (kg/g) | Mw/Mn | Decalin Solubles (wt. %) | NMR Tacticity Index |
|---|---|---|---|---|---|---|---|
| I | IBMDMS | 9.03 | 2.9 | 14.2 | 5.1 | 4.87 |  |
| II | IBMDMS | 3.97 | 2.5 | 12.4 | 5.1 | 5.90 | 86.1 |
| III | IBMDMS | 1.98 | 2.8 | 16.2 | 5.0 | 6.81 | 85.6 |
| IV | IBMDMS | 1.32 | 2.6 | 13.9 | 5.4 | 7.39 |  |
| (1) | DIBDMS | 1.98 | 3.0 | 22.0 | 5.7 | 3.94 |  |
| (2) | DIBDMS | 1.13 | 2.8 | 19.7 | 6.4 | 7.80 |  |
| (3) | DIBDES | 3.97 | 2.8 | 10.2 | 5.8 | 5.62 | 88.6 |
| (4) | DIBDES | 1.98 | 2.4 | 7.8 | 6.8 | 7.56 |  |

TABLE II-continued

Summary of Polymerization Results with Selected External Modifiers

| Ex. (Run) | Silane Modifier | Si/Ti | MFR (g./10 min.) | Polymer Yield (kg/g) | Mw/Mn | Decalin Solubles (wt. %) | NMR Tacticity Index |
|---|---|---|---|---|---|---|---|
| (5) | DCHDMS | 3.97 | 2.7 | 11.9 | 6.9 | 3.26 | |
| (6) | DCHDMS | 1.98 | 2.7 | 15.5 | 7.2 | 6.30 | 88.1 |
| (7) | CHMDMS | 3.97 | 2.9 | 14.9 | 5.1 | 2.59 | |
| (8) | CHMDMS | 1.98 | 2.8 | 18.8 | 5.4 | 4.26 | 89.2 |
| (9) | CHMDMS | 1.32 | 2.5 | 15.4 | 5.8 | 5.82 | |
| (10) | CPMDMS | 3.97 | 2.8 | 14.1 | 5.1 | 3.14 | |
| (11) | CPMDMS | 1.98 | 3.0 | 14.7 | 5.2 | 4.58 | 87.8 |
| (12) | PMDES | 3.97 | 2.6 | 6.2 | 6.0 | 5.66 | 87.7 |
| (13) | PMDES | 1.98 | 2.9 | 8.1 | 6.1 | 7.86 | |

Data in Table III present a summary of the NMR pentad distribution for selected polymer samples from this study as well as some reference samples made with DIBDMS. As discussed above, two of the pentads (mmrr and mrrm) result from an isolated tacticity mistake in an isotactic sequence. A higher percentage of these isolated tacticity mistakes translates to a more random distribution of the tacticity defects within the polymer.

TABLE III

Summary of NMR Pentad Distribution Results

| Silane | Decalin Solubles | mmmm | mmmr | rmmr | mmrr | mmrm + rmrr | rmrm | mrrm | mrrr | rrrr |
|---|---|---|---|---|---|---|---|---|---|---|
| DIBDMS | 4.1 | 90.7 | 2.3 | 0.8 | 2.0 | 0.9 | 0.4 | 1.1 | 0.8 | 0.9 |
| | 5.7 | 88.8 | 2.6 | 1.0 | 2.4 | 1.1 | 0.5 | 1.3 | 1.0 | 1.3 |
| | 6.6 | 88.3 | 2.7 | 0.9 | 2.6 | 1.2 | 0.5 | 1.4 | 1.1 | 1.3 |
| DCHDMS | 6.3 | 88.1 | 3.0 | 0.9 | 2.3 | 1.2 | 0.5 | 1.2 | 1.2 | 1.6 |
| DIBDES | 5.6 | 88.6 | 3.0 | 0.9 | 2.3 | 1.2 | 0.5 | 1.2 | 1.2 | 1.6 |
| PMDES | 5.6 | 87.7 | 3.5 | 0.9 | 2.6 | 1.1 | 0.5 | 1.4 | 1.0 | 1.4 |
| IBMDMS | 5.9 | 86.1 | 3.8 | 0.9 | 3.3 | 1.1 | 0.7 | 1.7 | 1.0 | 1.5 |
| | 6.8 | 85.6 | 3.9 | 0.8 | 3.6 | 1.1 | 0.4 | 1.8 | 1.2 | 1.6 |
| CPMDMS | 4.7 | 87.6 | 3.6 | 0.9 | 2.9 | 1.0 | 0.4 | 1.5 | 1.0 | 1.2 |
| | 4.5 | 88.0 | 3.4 | 0.8 | 2.8 | 0.9 | 0.4 | 1.4 | 0.9 | 1.2 |
| CHMDMS | 4.3 | 89.2 | 3.1 | 0.7 | 2.4 | 0.9 | 0.4 | 1.2 | 0.9 | 1.2 |

Figure 3:
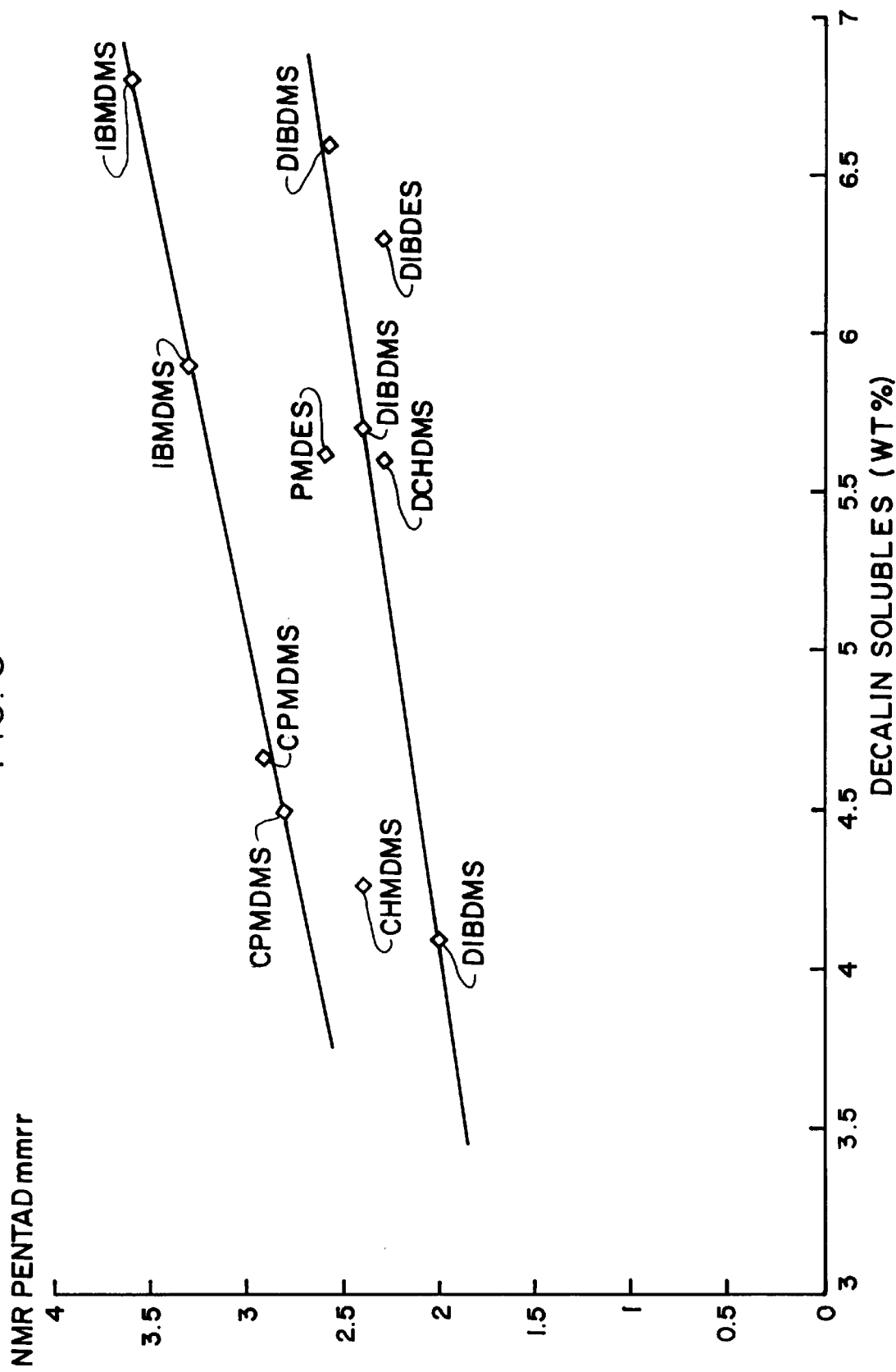
FIG. 3 is a plot of NMR mmrr Pentad versus Decalin Solubles for polypropylene resins prepared using selected silane external modifiers.

Data in Table III regarding the mmrr pentad is summarized in FIG. 3 as plots of the percentages of the mmrr pentad versus Decalin Solubles. This illustrates that resins made using two different groupings of silane external modifiers display different NMR tacticity versus DS relationships. The silane group which is characterized by a steeper slope on the DS versus Si/Ti relationship has a lower percentage of isolated tacticity mistakes for a given DS when compared to the silane group with the less steep slope.

The tacticity defect control described above can be directly translated into a polymer processing advantage. The SDMA test specifically examines the polymer properties associated with the solid-to-melt transition. Polymer properties near that transition determine the processability of the polymer in applications such as OPP film manufacture. The SDMA results indicate the polymer samples which have a more random distribution of the tacticity defects display a processing window temperature range for OPP which is larger than typical silanes, such as DIBDMS. This larger processing window should translate directly into a resin which is easier to process for OPP manufacturers.

Figure 4:
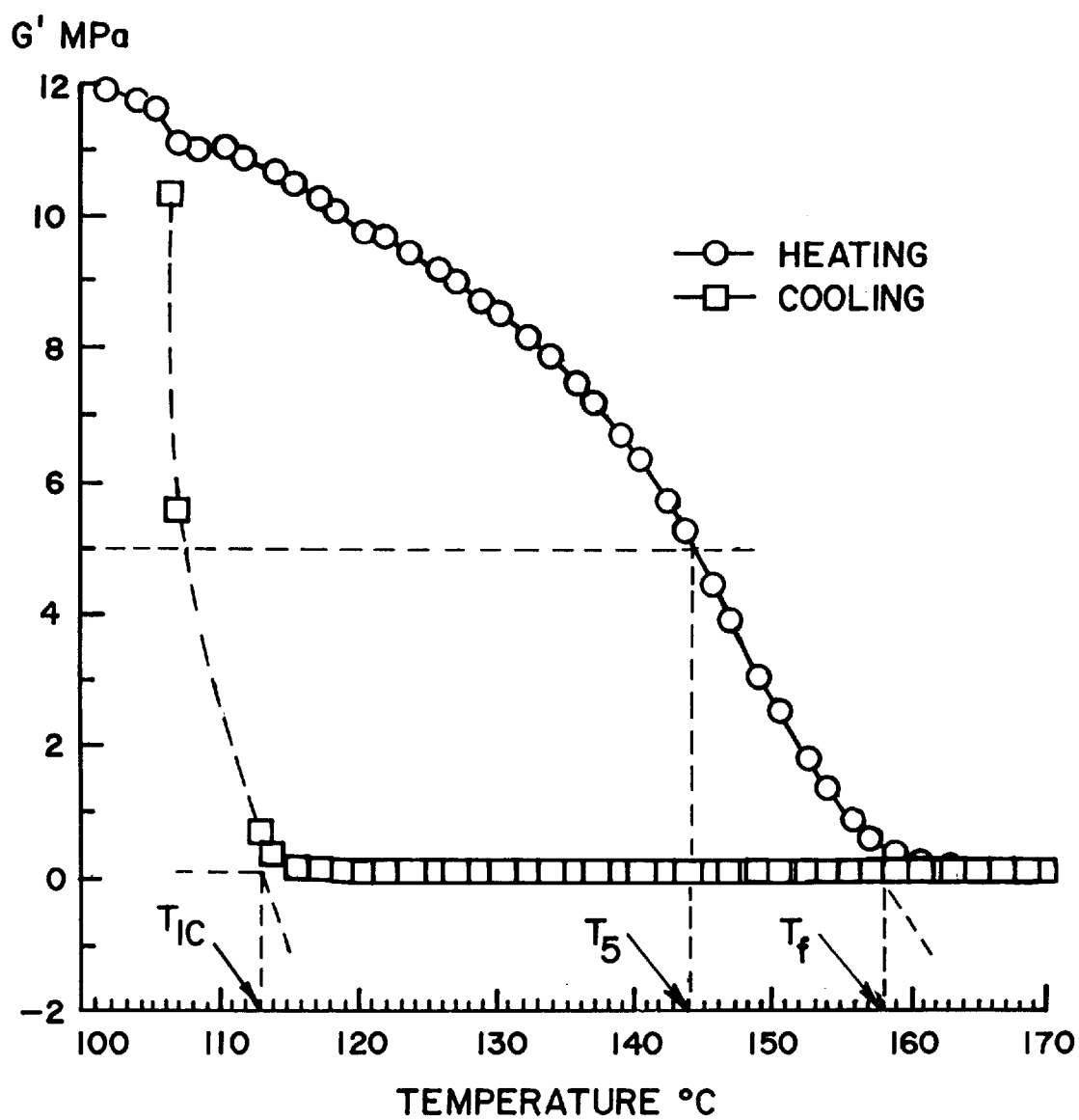
FIG. 4 is a plot of G' (mPa) versus temperature (0° C.) for polypropylene resin identified as Sample B.

FIG. 4 shows storage shear modulus (G') spectra of an IBMDMS OPP resin (identified as Sample B). The heating G' spectrum starts from solid state and extends into the molten state and has a plateau region of molten state. The cooling G' spectrum starts in the molten state plateau and runs into the solid state, at which point G' increases rapidly. From the G' spectra, three temperatures, $T_f$, $T_s$ and $T_{IC}$, are determined (FIG. 4). $T_f$ and $T_s$ are determined from heating spectrum and $T_{IC}$ is determined from cooling spectrum.

$T_f$ is the flow temperature at which the sample is completely melted and starts to flow. $T_s$ is the temperature at which G' equals 100×G' at $T_f$, which in the runs made, was at 5 mPa. The temperature difference, ($\Delta T = T_f - T_s$), indicates a temperature range, in which the sample goes through the solid to melt transition with the same changes in elastic modulus (G'). It is observed that ΔT increases with the sample having lower tacticity. In film and thermoforming processes, polymers must be processed at the temperature region or processing window near but below their melting point. At this temperature region, polymer becomes soft and partially melts for easy processing. The ΔT can be used to correlate with the actual processing temperature window.

$T_{IC}$ is the strain induced crystallization temperature at which G' increases due to the strain induced crystallization of the sample. Thus, $T_{IC}$ is the temperature at which the sample starts to solidify. This information is important to fiber spinning and injection molding. $T_{IC}$ is also related to the tacticity of the resin. A high tacticity sample will crystallize faster than a low tacticity sample. Thus, the high tacticity sample will have a higher $T_{IC}$.

Figure 5:
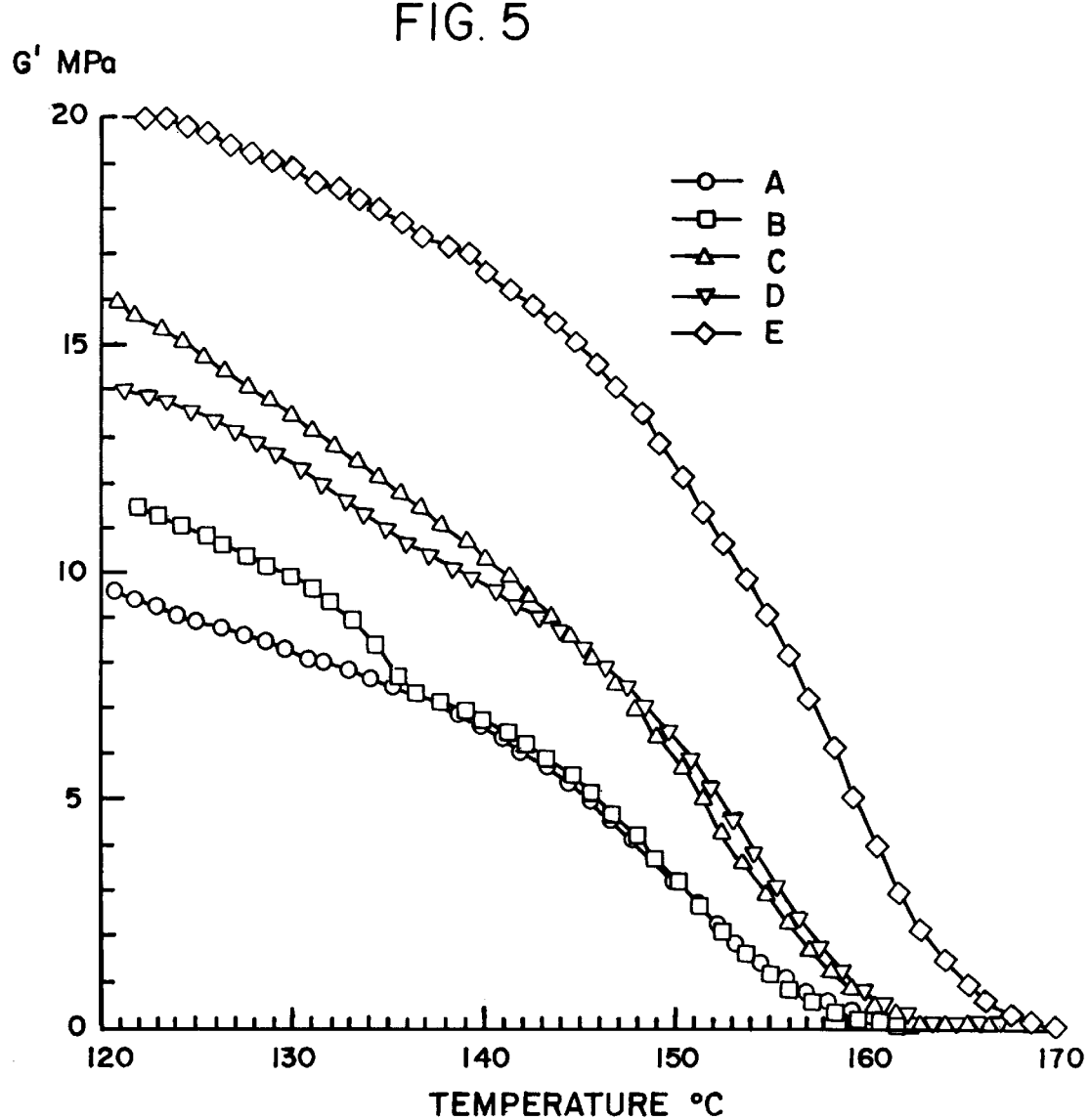
FIG. 5 is a plot of heating mode G' (mPa) versus temperature (0° C.) for polypropylene resins identified as Samples A–E.
Figure 6:
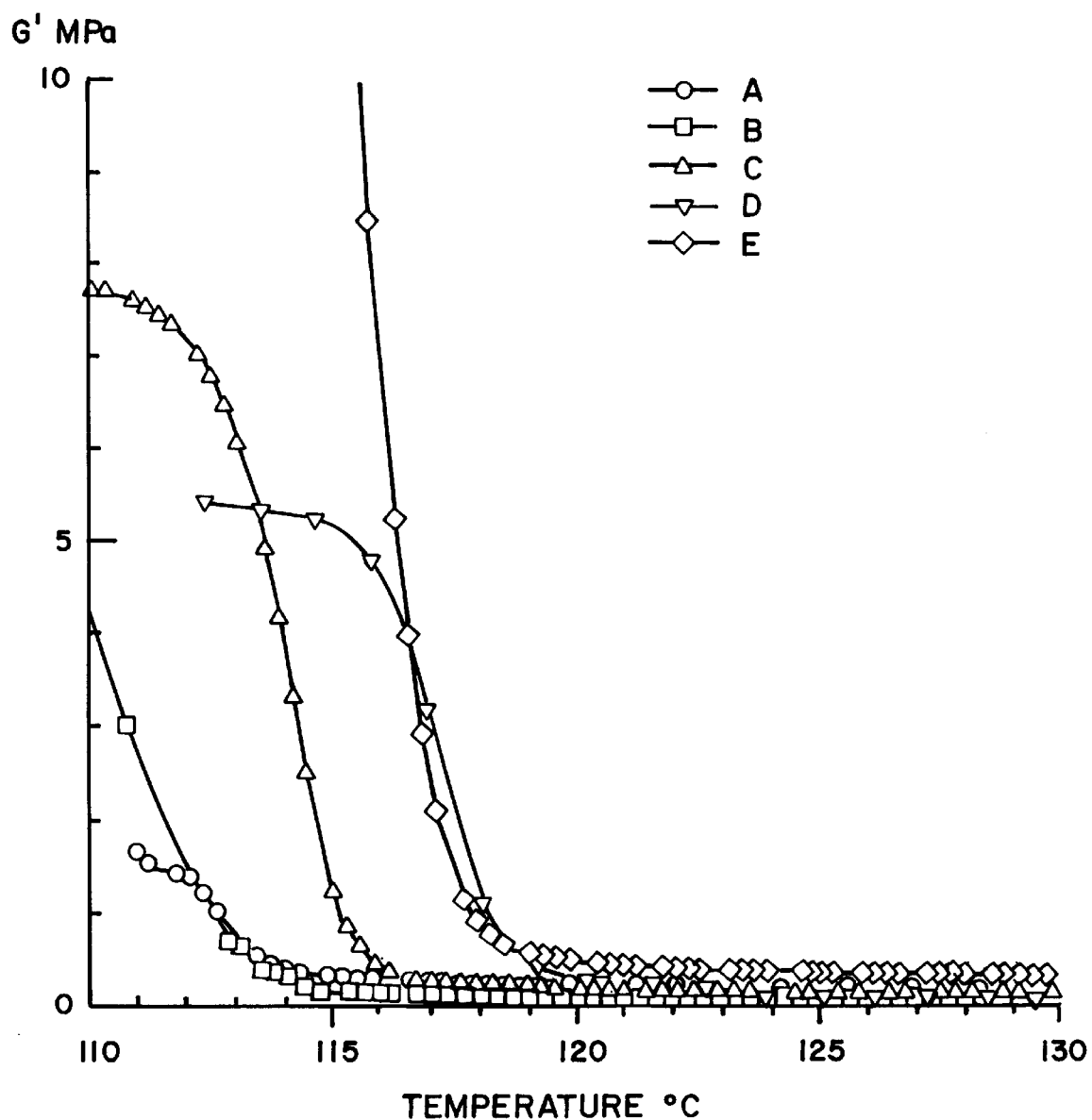
FIG. 6 is a plot of cooling mode G' (mPa) versus temperature (0° C.) for polypropylene resins identified as Samples A–E.

FIGS. 5 and 6 show the heating and cooling G' spectra of different propylene polymer resins. As shown in these figures, the G' changes with external catalyst modifiers which control the sample tacticity. The sample with lower tacticity has lower G' and greater ΔT (FIG. 5 and Table V).

The flow temperature $T_f$ is also lower for low tacticity samples (FIG. 5). The strain induced crystallization temperature ($T_{IC}$) also decreased with sample tacticity (FIG. 6 and Table V). The SDMA results show that the measurement of $\Delta T$ and $T_{IC}$ can be used as a processability measurement. Therefore, molecular structure of polypropylene resins produced with the different modifier can be correlated with possible commercial utility (enhanced processing window for OPP film, and possible in thermoforming, fiber spinning, and injection molding).

EXAMPLE V—COMPARATIVE RUNS 14–24

A series of polymer samples was analyzed using the SDMA test. Polypropylene was produced in a gas-phase pilot plant using a HAC catalyst component similar to that used in Example I with triethylaluminum used as a co-catalyst. Various external silane modifiers were used. Results are shown in Table VI.

TABLE VI

| Example (Run) | Silane[1] | $\Delta T$ | $T_S$ | $T_f$ | $T_{IC}$ | Al/Si | Yield[2] (Kg/g cat.) | DS |
|---|---|---|---|---|---|---|---|---|
| V | IBMDMS | 16.5 | 154.5 | 171.0 | 122.6 | 20 | 23.5 | 5.67 |
| 14 | IPMDMS | 11.0 | 162.5 | 173.5 | 123.9 | 40 | 37.9 | 3.56 |
| 15 | NPMDMS | 12.0 | 156.0 | 168.0 | 122.9 | 30 | 33.4 | 6.21 |
| 16 | NBMDMS | 14.0 | 155.5 | 169.5 | 122.9 | 3 | 9.34 | 7.64 |
| 17 | NPeMDMS | 16.0 | 154.0 | 170.0 | 121.9 | 3 | 8.49 | 6.38 |
| 18 | IAMDMS | 13.0 | 155.0 | 168.0 | 120.5 | 3 | 8.94 | 7.82 |
| 19 | NeHMDMS | 14.0 | 155.0 | 169.0 | 121.5 | 3 | 11.9 | 8.23 |
| 20 | COMDMS | 12.5 | 159.0 | 171.5 | 122.2 | 40 | 16.9 | 5.58 |
| 21 | NPhMDMS | 12.5 | 158.5 | 171.0 | 121.3 | 3 | 14.3 | 5.97 |
| 22 | CPMDMS | 10.8 | 159.7 | 170.5 | 121.2 | — | — | — |
| 23 | CHMDMS | 10.8 | 159.5 | 173.5 | 123.7 | — | — | — |
| 24 | DIBDMS | 10.5 | 162.5 | 173.0 | 123.7 | — | 39.1 | 3.03 |

[1]Dimethoxysilanes:
IBM  isobutylmethyl
IPM  isopropylmethyl
NPM  n-propylmethyl
NBM  n-butylmethyl
NPeM  n-pentylmethyl
IAM  isoamylmethyl
NeHM  neohexylmethyl
COM  cyclooctylmethyl
NPhM  neophylmethyl
CPM  cyclopentylmethyl
CHM  cyclohexylmethyl
DIB  diisobutyl

[2]Kg of polypropylene/g of solid catalyst component measured by Ti analysis.

The shear mode DMA results ($T_f$, $T_s$, and $T_{IC}$) are compared with DSC results. In Table V, $T_{co}$ is the onset crystallization temperature, $T_c$ is the peak crystallization temperature, and $T_m$ is the peak melting temperature. In general, $T_f$, $T_s$, $T_{IC}$, and $T_m$, are well correlated.

TABLE V

Comparison of Shear DMA and DSC Results

| Sample | A | B | C | D | E |
|---|---|---|---|---|---|
| Modifier | IBMDMS | IBMDMS | DIBDMS | DCHDMS | DIPDMS* |
| DS | 7.43 | — | 8.49 | 6.69 | 1.56 |
| MFR | 3.1 | 3.0 | 2.7 | 2.7 | 1.3 |
| SDMA Results | | | | | |
| $T_{IC}$ (° C.) | 114.5 | 114.0 | 116.0 | 119.0 | 118.0 |
| $T_S$ (° C.) | 145.5 | 145.5 | 152.0 | 152.5 | 159.5 |
| $T_f$ (° C.) | 159.0 | 159.0 | 160.5 | 161.5 | 165.5 |
| $\Delta T = T_f - T_S$ (° C.) | 13.5 | 13.5 | 8.5 | 9.0 | 6.0 |
| DSC Results | | | | | |
| $T_{co}$ (° C.) | 114.6 | 111.8 | 113.7 | 114.7 | — |
| $T_c$ (° C.) | 104.2 | 106.0 | 107.5 | 106.4 | 109.9 |
| $T_m$ (° C.) | 159.2 | 161.2 | 162.3 | 165.4 | 158.5 |

*Sample E prepared in large-scale gas-phase pilot plant using diisopropyldimethoxysilane (DIPDMS) at Al/Si = 9.

These data demonstrate that the polypropylene product produced using IBMDMS as the external silane modifier exhibited the highest $\Delta T$ while maintaining substantial catalyst yield. Conventional polymers, such as that made using DIBDMS, were made in very good yield, but lacked the broad thermal processing window as measured by $\Delta T$. In contrast, other propylenes which had a relatively high $\Delta T$, such as produced using n-pentylmethyldimethoxysilane were made in substantially lower yield.

These results are unexpected and demonstrate unique properties of use of IBMDMS as an external modifier to produce a polypropylene resin especially suitable for manufacture of OPP film.

EXAMPLE VI—OPP FILM TRIAL

In order to confirm that the polypropylenes made according to this invention were superior in manufacture of OPP film, a trial was conducted on a one-meter film line using standard conditions for film production. The test was run such that the preheat temperature for the transverse direction (TD) stretching was gradually decreased until the film broke during the TD orientation. The line was restrung after adjusting to standard TD preheat. The decrease in TD preheat was repeated until the film broke during the TD orientation which was used to determine the minimum TD preheat temperature. The second step of each trial was to raise the preheat temperature to find an upper temperature limit. Although a break could not be caused in TD stretching, the film became so hazy as the temperature increased to make the product undesirable.

The next step in each trial was to change the stretch ratios to determine if at standard TD preheat, a greater degree of orientation was possible. The adjustment of TD stretch ratio was kept at 9:1 for all the trials. The standard machine direction (MD) stretch used for the trials was 4.3:1. At standard TD preheat, the MD stretch was increased in increments of 0.2 until the film broke during TD stretching. The greater the orientation during MD stretching, the more likely breaking in TD occurred. Trials were performed using three polypropylene samples. Polymer of Run 25 was a conventional slurry-phase polypropylene produced using HAC/TEA with DIBDMS as the external silane modifier. Polymer of Run 26 was a conventional gas-phase polypropylene produced using HAC/TEA with DIBDMS as the external silane modifier. Polymer of Example VI was an experimental gas-phase polypropylene produced using HAC/TEA with IBMDMS as the external silane modifier as described above. This polymer was produced in a pilot plant apparatus similar to that described in Example I, but at a larger scale. The polypropylene of Example VI had an MFR of 2.9 dg/min, bulk density of 28.1 lb/ft3, hexane extractables of 1.89 wt. %, decalin solubles of 5.32 wt. %, NMR %m4 of 85.5, and Mw/Mn of 5.18. The results of the film trials are shown in Table VII.

TABLE VII

| Ex. (Run) | TD Preheat (° C.) Min. | TD Preheat (° C.) Max | Orientation MD | Orientation TD | Total (product of MD × TD) |
|---|---|---|---|---|---|
| (25) | 169 | 194* | 4.7 | 9.0 | 42 |
| (26) | 164 | 189 | 4.8 | 9.0 | 43 |
| VI | 158 | 188 | 5.6 | 9.0 | 50 |

*Film was noted to be hazy at 188° C. preheat. For other samples, increased preheat temperature experiment was stopped when film became hazy. The upper temperature limit was similar for all three samples.

The data show the Polymer 26 resin had a slightly broader processing window than the Polymer 25 product. However, the Example VI product had a significantly broader processing window than either the Polymer 25 or Polymer 26 resins. In addition, the Example VI product can be oriented to a significantly greater degree than either of the other two products.

What is claimed is:

1. An oriented polypropylene film made from a homopolymer of propylene produced by polymerizing propylene in gas-phase, bulk, or slurry using a catalyst system comprising:
    (a) a high activity magnesium halide-supported, titanium-containing solid component;
    (b) an aluminum alkyl; and
    (c) an external modifier comprising isobutylmethyldimethoxysilane;

wherein the Si/Ti ratio is about 1 to about 10 and the Al/Ti ratio is about 10 to about 500, and wherein the polypropylene has an NMR mmrr pentad content of greater than 3% and decalin solubles greater than 5 wt. %.

2. The oriented polypropylene film of claim 1 wherein the NMR mmrr pentad content of greater than 3.5% and decalin solubles greater than 6 wt. %.

3. The oriented polypropylene film of claim 1 wherein the aluminum alkyl comprises triethylaluminum.

4. The oriented polypropylene film of claim 1 wherein polypropylene is polymerized in the gas phase.

5. The oriented polypropylene film of claim 1 wherein the propylene polymer has a $\Delta T$ measured by a SDMA Test of above 10.

6. A process to form a biaxially oriented polypropylene film comprising:
    (a) forming a film by extruding a homopolymer of propylene produced by polymerizing propylene in gas-phase, bulk, or slurry under polymerization conditions using
        (i) a high activity magnesium halide-supported, titanium-containing solid component,
        (ii) an aluminum alkyl,
        (iii) an external modifier comprising isobutylmethyldimethoxysilane; and
    wherein the Si/Ti ratio is about 1 to about 10 and the Al/Ti ratio is about 10 to about 500, and wherein the polymer has an NMR mmrr pentad content of greater than 3% and decalin solubles greater than 5 wt. %; and
    (b) stretching the resulting film in the machine direction and in the transverse direction to form a biaxially oriented film.

7. The process of claim 6 wherein the NMR mmrr pentad content of the polypropylene is greater than 3.5% and decalin solubles greater than 6 wt. %.

8. The process of claim 6 wherein polypropylene is polymerized in the gas phase.

9. The process of claim 6 wherein the aluminum alkyl comprises triethylaluminum.

10. The process of claim 6 wherein the propylene polymer has a $\Delta T$ measured by a SDMA Test of above 10.

11. The process of claim 6 wherein the propylene polymer has a $\Delta T$ measured by a SDMA Test of above 13.

* * * * *

UNITED STATES PATENT AND TRADEMARK OFFICE
CERTIFICATE OF CORRECTION

PATENT NO. : 6,201,079 B1
DATED : March 13, 2001
INVENTOR(S) : Jerome Anthony Streeky, Bruce Howard Bersted, John William Blake, Daan Feng, Charles Richard Hoppin, Benjamin Samuel Tovrog It is certified that error appears in the above-identified patent and that said Letters Patent is hereby corrected as shown below:

Column 2,
Line 15, "component such as at silane" should read -- component such as a silane --

Column 3,
Line 36, "temperature (0°C.) for" should read -- temperature (°C) for --
Line 39 "(0°C.) for polypropylene" should read -- (°C) for polypropylene --
Line 42, "(0°C.) for polypropylene" should read -- (°C) for polypropylene --

Column 5,
Line 19, "diisobutyidimethoxysilane" should read -- diisobutyldimethoxysilane --

Column 6,
Line 55, "Groups I-Ill; magnesium" should read -- Groups I-III; magnesium --

Column 8,
Line 14, "activity and stereospecifdty." should read -- activity and stereospecificity --

Column 10,
Line 22, "also may be carded out" should read -- also may be carried out --
Line 43, "Mg(Cl$_2$H$_{25}$)$_2$," should read -- Mg(C$_{12}$H$_{25}$)$_2$, --

Column 13,
Line 43-45, "COMPARATIVE RUNS 1-3" should read -- Comparative Runs 1-13 --

UNITED STATES PATENT AND TRADEMARK OFFICE
CERTIFICATE OF CORRECTION

PATENT NO. : 6,201,079 B1
DATED : March 13, 2001
INVENTOR(S) : Jerome Anthony Streeky, Bruce Howard Bersted, John William Blake, Daan Feng, Charles Richard Hoppin, Benjamin Samuel Tovrog It is certified that error appears in the above-identified patent and that said Letters Patent is hereby corrected as shown below:

Column 14,
Line 8, "equipped with an on-gas" should read -- equipped with an off-gas --

Column 16,
Line 25, "$T_S$ is the temperature" should read -- $T_5$ is the temperature --

Signed and Sealed this

Eleventh Day of December, 2001

Attest:

NICHOLAS P. GODICI
*Acting Director of the United States Patent and Trademark Office*

*Attesting Officer*